(12) United States Patent
Lunt et al.

(10) Patent No.: US 7,613,869 B2
(45) Date of Patent: Nov. 3, 2009

(54) LONG-TERM DIGITAL DATA STORAGE

(75) Inventors: Barry M. Lunt, Provo, UT (US);
Matthew R. Linford, Orem, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 11/765,937

(22) Filed: Jun. 20, 2007

(65) Prior Publication Data
US 2008/0320205 A1    Dec. 25, 2008

Related U.S. Application Data

(60) Provisional application No. 60/861,683, filed on Nov. 27, 2006.

(51) Int. Cl.
*G06F 12/00* (2006.01)
(52) U.S. Cl. .................. 711/102; 430/320; 430/270.11; 430/945
(58) Field of Classification Search ........................ None
See application file for complete search history.

(56) References Cited

U.S. PATENT DOCUMENTS

| | | | | |
|---|---|---|---|---|
| 4,097,895 A | * | 6/1978 | Spong .................... | 369/275.1 |
| 4,101,907 A | * | 7/1978 | Bell et al. ............... | 369/275.5 |
| 4,195,313 A | * | 3/1980 | Bell et al. ............... | 369/275.1 |
| 4,218,689 A | * | 8/1980 | Bloom et al. ............ | 346/135.1 |
| 4,241,355 A | * | 12/1980 | Bloom et al. ............ | 346/135.1 |
| 4,314,260 A | | 2/1982 | Drexler | |
| 4,315,269 A | * | 2/1982 | Bloom et al. ............ | 346/135.1 |
| 4,364,986 A | * | 12/1982 | Zwanenburg et al. ....... | 428/156 |
| 4,380,769 A | | 4/1983 | Thomas et al. | |
| 4,430,659 A | * | 2/1984 | Maffitt et al. ............ | 346/135.1 |
| 4,486,286 A | | 12/1984 | Lewin et al. | |
| 4,578,684 A | | 3/1986 | Gupta et al. | |

(Continued)

FOREIGN PATENT DOCUMENTS

EP          0 214 539       *    3/1987

(Continued)

OTHER PUBLICATIONS

W.L Holstein et al., "Mechanisms of Laser Writing for Optical Data Storage", Journal of Applied Physics, vol. 60, No. 8, Oct. 15, 1986, pp. 2938-2943.*

(Continued)

*Primary Examiner*—Mark F Huff
*Assistant Examiner*—Anna L Verderame
(74) *Attorney, Agent, or Firm*—Pepper Hamilton LLP

(57) ABSTRACT

Embodiments are directed to recording digital data on an optically ablatable digital storage media. In one embodiment, a device configured to ablate portions of ablatable material on an optically ablatable digital storage media receives digital data that is to be recorded on a recording layer of an optically ablatable digital storage media. The recording layer is formed on a substrate with zero or more intervening layers between the recording layer and the substrate. The recording layer includes ablatable material capable of storing digital data. The device ablates the ablatable material in the recording layer according to a sequence defined by the received digital data such that the ablated portions correspond to data points of the received digital data.

19 Claims, 5 Drawing Sheets

U.S. PATENT DOCUMENTS

| | | | |
|---|---|---|---|
| 4,603,099 A | | 7/1986 | Drexler |
| 4,622,095 A | * | 11/1986 | Grobman et al. ............... 216/65 |
| 4,792,474 A | | 12/1988 | Murakami et al. |
| 4,918,682 A | * | 4/1990 | Finegan ................... 369/275.2 |
| 4,998,239 A | | 3/1991 | Strandjord et al. |
| 5,283,159 A | * | 2/1994 | Norton et al. .......... 430/270.15 |
| 5,294,518 A | | 3/1994 | Brady et al. |
| 5,399,459 A | | 3/1995 | Simpson et al. |
| 5,411,838 A | | 5/1995 | Strandjord et al. |
| 5,426,013 A | | 6/1995 | Strandjord et al. |
| 5,440,507 A | | 8/1995 | Brady et al. |
| 5,494,782 A | * | 2/1996 | Maenza et al. ............... 430/321 |
| 5,510,164 A | * | 4/1996 | Best et al. .................. 428/64.1 |
| 5,572,491 A | | 11/1996 | Karibe et al. |
| 5,595,791 A | | 1/1997 | Baumgart et al. |
| 5,640,382 A | | 6/1997 | Florczak et al. |
| 5,723,033 A | | 3/1998 | Weiss |
| 5,783,360 A | | 7/1998 | Phillips et al. |
| 5,976,714 A | | 11/1999 | Arita et al. |
| 6,007,889 A | | 12/1999 | Nee |
| 6,022,604 A | * | 2/2000 | Del Mar et al. ............ 428/64.1 |
| 6,045,889 A | | 4/2000 | Fukano et al. |
| 6,093,472 A | | 7/2000 | Xuan et al. |
| 6,143,468 A | | 11/2000 | Ohno et al. |
| 6,218,072 B1 | | 4/2001 | Otaguro et al. |
| 6,403,170 B2 | | 6/2002 | Kuo et al. |
| 6,413,680 B1 | | 7/2002 | Watanabe et al. |
| 6,451,402 B1 | | 9/2002 | Nee |
| 6,667,939 B1 | | 12/2003 | Miyamoto |
| 6,716,506 B2 | | 4/2004 | Yan |
| 7,002,887 B2 | | 2/2006 | Kakiuchi et al. |
| 7,003,619 B1 | | 2/2006 | Moore et al. |
| 7,136,349 B2 | | 11/2006 | Nishiuchi et al. |
| 2002/0164495 A1 | * | 11/2002 | Sweet et al. ................. 428/534 |
| 2002/0182444 A1 | * | 12/2002 | Kuo et al. ............. 428/694 SG |
| 2003/0012098 A1 | | 1/2003 | Sako et al. |
| 2003/0157292 A1 | * | 8/2003 | Medower et al. ........... 428/64.4 |
| 2005/0127032 A1 | * | 6/2005 | Nakada et al. ................. 216/41 |

FOREIGN PATENT DOCUMENTS

JP        06-251425     *   9/1994

OTHER PUBLICATIONS translation JP-06-251425.*
Kuhnke et al. "Microstructuring of glassy carbon: comparison of laser machining and reactive ion etching" Thin Solid Films 453-454(2004)36-41 as applied above, in view of Medower et al. US 2003/0157292.*

* cited by examiner

LONG-TERM DIGITAL DATA STORAGE

CROSS REFERENCE TO RELATED APPLICATIONS

This application claims the benefit of U.S. Provisional Application No. 60/861,683 entitled "Long-term Computer Data Storage" filed on Nov. 27, 2006.

BACKGROUND

Computers have steadily increased in popularity since their introduction into modern society. Computers and other types of digital electronics have simplified many tasks and facilitated new innovations that have changed the way we live. Today, with personal digital assistants (PDA's), cellular telephones, digital cameras, digital video recorders, digital music players and widespread Internet connectivity, people are recording more data than ever before to a wide variety of digital media storage devices. For example, many people have collections of digital photos, videos, songs, web pages, text files and other digital content stored on hard drives, CD's, DVD's, flash drives and other types of digital storage media.

Digital data storage media has many advantages. For example, all types of digital storage media allow for perfect reproduction and storage of digital files. Such files can be easily transferred to and from various digital storage media without any loss of data or quality. Another notable advantage of digital recordable media lies in its consumer appeal. From flash drives to hard drives to multi-layer DVD's, nearly all types of digital storage media have grown in capacity and substantially decreased in price. As a result, digital storage devices continue to gain popularity with consumers.

Optical storage devices have particularly grown in consumer use, in large part due to the ease of use and ubiquity of optical media players and recorders. Optical storage media can be categorized into two general types: commercially manufactured media in which the data layer is "stamped" using a laser-cut mold, and consumer-writable media in which the data layer is "burned" using a CD or DVD burner. Such consumer-writable media (e.g. CD-R/RW's, DVD±R/RW/RAM, etc.) is often used as long term data storage for photos, songs and other files.

Although such burnable optical media are widely considered to keep data forever, this is not the case. Such burnable optical media tends to degrade over time. For instance, in a typical write operation to an optical media, an energy source is focused on the media in a pattern of intense bursts, thus creating marks that can be interpreted as 1's and 0's. This "burning" process chemically alters the molecules of the optical media data layer, which is usually made of some type of metal alloy and an optical dye. Though the term "burning" implies some high level of permanence, the chemical alteration is, in fact, not permanent and actually degrades each time the media is read. Storing at high temperatures, high humidity, or high light levels can also degrade the media. Over time, the optical contrast between the marks representing 1's and 0's fades and the data becomes unreadable despite the confidence that consumers and even sophisticated technicians place in such media.

BRIEF SUMMARY OF THE INVENTION

Embodiments of the present invention are directed to recording digital data on an optically ablatable digital storage media. In one embodiment, a device configured to ablate portions of ablatable material on an optically ablatable digital storage media receives digital data that is to be recorded on a recording layer of an optically ablatable digital storage media. The recording layer is formed on a substrate with zero or more intervening layers between the recording layer and the substrate. The recording layer includes ablatable material capable of storing digital data. The device ablates the ablatable material in the recording layer according to a sequence defined by the received digital data such that the ablated portions correspond to data points of the received digital data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments described herein are directed to recording digital data on an optically ablatable digital storage media. In one embodiment, a device configured to ablate portions of ablatable material on an optically ablatable digital storage media receives digital data that is to be recorded on a recording layer of an optically ablatable digital storage media. The recording layer is formed on a substrate with zero or more intervening layers between the recording layer and the substrate. The recording layer includes ablatable material capable of storing digital data. The device ablates the ablatable material in the recording layer according to a sequence defined by the received digital data such that the ablated portions correspond to data points of the received digital data.

Figure 1:
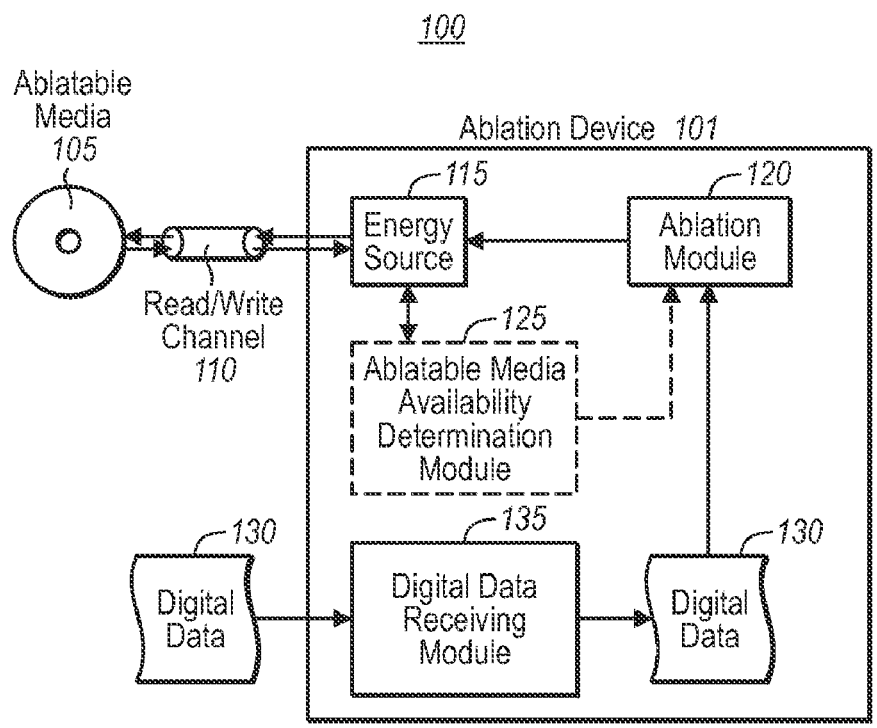
FIG. 1 illustrates a component architecture in which embodiments of the present invention may operate by, for example, recording digital data on an optically ablatable digital storage media.

FIG. 1 illustrates a component architecture 100 in which the principles of the present invention may be employed. Component architecture 100 includes ablation device 101. In some embodiments, ablation device 101 may be configured to ablate portions of ablatable material on an optically ablatable digital storage media. Ablation is a process of instantaneously applying a sufficient amount of energy to an object that the object's ablatable material is removed. In some cases, the ablated material is evaporated into a gas. Examples of using ablation to record digital data will be explained in greater detail below. The evaporative changes made to the ablatable material are more permanent in nature and are not likely to rapidly degrade over time. It should be noted that the term "instantaneously" is used to imply that the process is performed quickly, but should not be limited to any certain amount of time. Furthermore, the term "permanent," as used herein, implies exceptional robustness, durability and a lack of any tendency to degrade, and is not intended to imply infinite permanence.

The amount of energy required to instantaneously raise the temperature of an ablatable material will vary greatly depending on the material. For example, glassy carbon is a carbon structure with multiple, tightly bound carbon-carbon double bonds which give glassy carbon absorptive properties advantageous for ablation. Other materials will similarly be more or less suited to ablation. Another measure used in the process of ablation is the amount of energy used to exact the change. This measurement will be referred to herein as an ablation energy. It should be noted that complete ablation is not always necessary. In some cases, partial ablation of the ablatable material may be sufficient. In other words, ablation may be considered complete even though some ablatable material remains at the point of ablation. The same is true of the reflective layer, as will be explained below. In some cases, the reflective layer need only reflect a portion of the ablation energy to be successful.

In some embodiments, the ablation energy may be measured as a unit of energy per unit volume of material. For example, thicker layers of ablatable material may require a greater amount of energy to ablate. Other materials may also be more or less likely to ablate, depending on the type of material and other conditions. Many factors affect both the desired temperature and the desired energy level. Other factors may also be varied to aid in ablation such as exposure time or wavelength of the energy source. For example, different wavelengths may be used to match the properties of the ablative layer such that ablation occurs more readily.

In some cases, a thicker layer of material may necessitate a longer or more intense exposure to ablation energy. Still other factors may include ambient temperature, humidity, the process by which the ablatable material was formed, the process by which the ablatable material was bonded to other materials in the ablatable media item, the type of ablation energy used in the process and the type and thickness of the reflective layer (when present). In some cases, measurements for exposure times, ablation energies and optimal thicknesses for any given ablatable layer and/or reflective layer are based on the type of material, thermal conductivity of the material, the surrounding environment and the amount of energy being imparted.

One of the deciding factors that determines whether ablation can occur or not is the total energy absorbed per unit surface area/volume of material that is being ablated. In some embodiments, it may be possible to use a conventional CD or DVD writer by adjusting exposure time and/or increasing the laser energy. The imparted energy should be sufficient to ablate the material in a particular portion of the media. The ablation process produces a permanent change in the ablated material and is highly robust against the many forms of degradation.

Referring again to FIG. 1, in some embodiments, the energy used for ablation may be provided by energy source 115. Energy source 115 may provide various types of energy including thermal, electrical, magnetic, radiant (light or optical energy) and/or sound energy. Energy source 115 may be configured to write to and read from ablatable media 105 via read/write channel 110. Read/write channel 110 may be any type of communication link including both physical and wireless links. Ablatable media 105 may be any type of digital media capable of being ablated. In some embodiments, ablatable media 105 may include optical discs similar to conventional CDs and DVDs.

FIG. 1 also includes an ablatable media availability determination module 125. Ablatable media availability determination module 125 may be configured to detect when ablatable media 105 is available for communication via read/write channel 110. In other embodiments, an ablation device user (not shown) may determine that ablatable media 105 is available for communication via read/write channel 110. Additionally or alternatively, ablatable media availability determination module 125 may be configured to communicate with ablation module 120.

Ablation module 120 may be configured to receive digital data 130 from digital data receiving module 135. In some embodiments, digital data receiving module may be configured to receive digital data 130 which is communicated to ablation module 120. Digital data 130 may represent any type of information in any format. Furthermore, the data may be encrypted, compressed, or otherwise modified from its original form. Digital data 130 may be received in organized portions such as files, or may be received as a stream of data. Digital data receiving module 135 may be configured to receive and, in some cases, process digital data 130 in some manner. Such processing may include encryption or decryption, compression or decompression, modifying, storing or any other form of data processing. The components of FIG. 1 will be described in greater detail below with reference to FIGS. 2-5.

Figure 2:
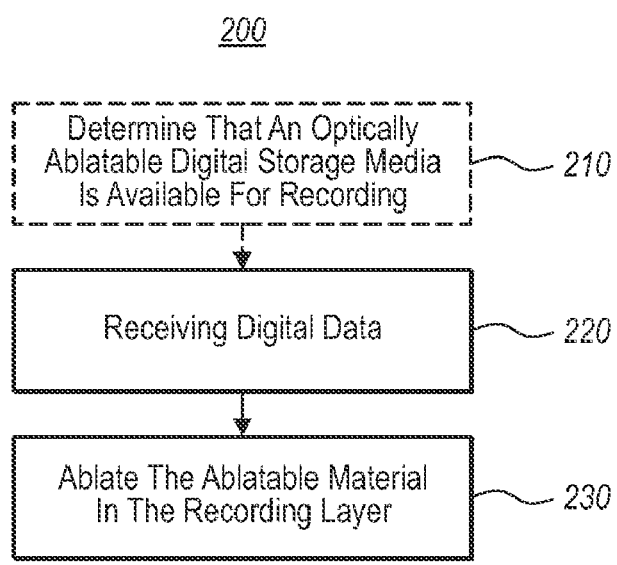
FIG. 2 illustrates a flowchart of an example method for recording digital data on an optically ablatable digital storage media.

FIG. 2 illustrates a flowchart of a method 200 for recording digital data on an optically ablatable digital storage media. The method 200 will now be described with frequent reference to the components and data of environment 100, ablatable media embodiments illustrated in FIGS. 3A-3D, 4A-4C and FIG. 7, and the ablation environments 500 and 600 of FIGS. 5 and 6, respectively. As used herein, reference to FIGS. 3-4 implies reference to FIGS. 3A-3D and 4A-4C. In some embodiments, method 200 may be carried out by a computer system. The computer system may comprise a special purpose or general-purpose computer including various types of computer hardware, as discussed in greater detail below.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Returning to FIG. 2, in some embodiments, method 200 includes an act of determining that an optically ablatable digital storage media is available for recording (act 210). For example, ablatable media availability determination module 125 may be configured to determine that optically ablatable digital storage media 105 is available for recording. In some cases, ablatable media availability determination module 125 may only be configured to determine that a media item is present and available for ablation. In other cases, ablatable media availability determination module 125 may be configured to determine that a media item is present and that the media item is ablatable.

Figure 3A:
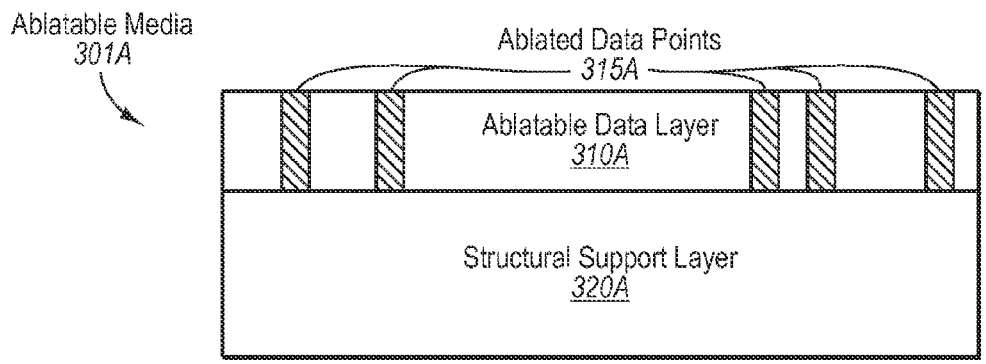
FIG. 3A through 3D each illustrate an example cross-section of various embodiments of ablatable media items.

Optically ablatable digital storage media 105, as shown by way of example in FIG. 3A, may include an ablatable data layer 310A formed on structural support layer 320A with no intervening layers between ablatable data layer 310A and structural support layer 320A, as shown in FIG. 3A.

In some embodiments, ablatable data layer 310A is a recording layer capable of storing information represented by ablated data points 315A. Ablated data points 315A are portions of ablatable data layer 310A that have been ablated. That is, ablatable material that once filled ablated data points 315A has been ablated, or evaporated into a gas. Ablated data points 315A may appear in any order, in any width, or may not occur at all for any given area of ablatable data layer 310A. For example, if digital data is being "written" or ablated (these terms may be used interchangeably herein) into ablatable data layer 310A, the data may correspond to variable length portions of 1's and 0's. Thus, according to the sequence of 1's and 0's as defined by the digital data, more or fewer ablated data points 315A may exist in any given portion of ablatable data layer 310A. Furthermore, ablated data points 315A may take a variety of form and shapes. For example, ablated data points 315A may be circular, oval, square, rectangular, irregularly-shaped, or any variation thereof that is capable of providing a sufficient optical contrast.

Figure 5:
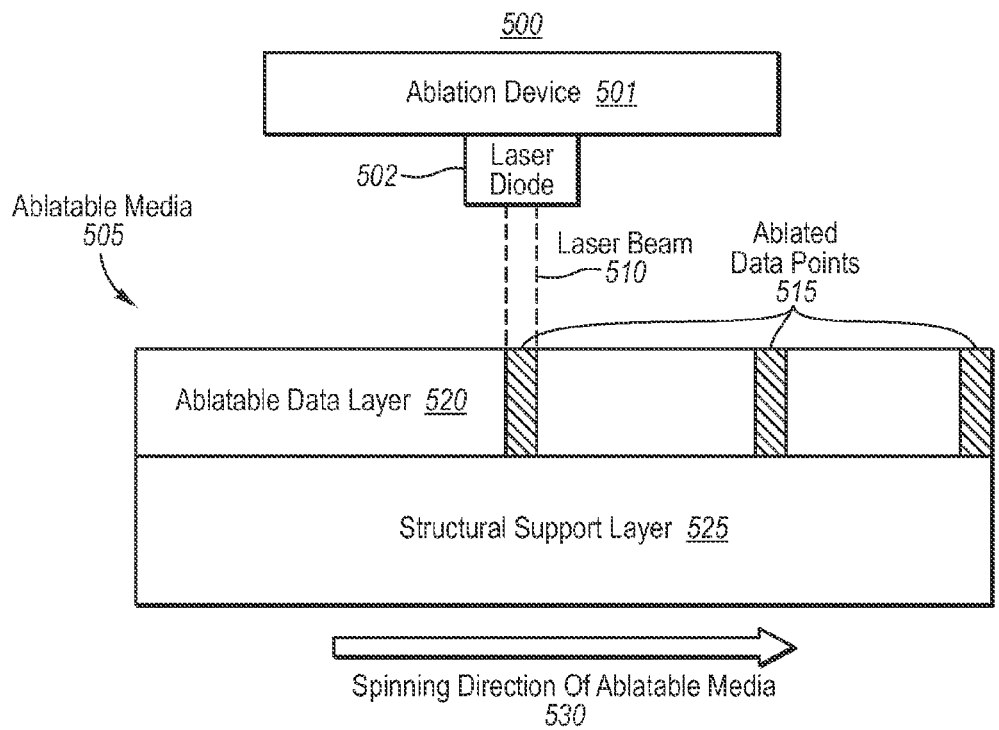
FIG. 5 illustrates a component environment in which digital data may be recorded on an optically ablatable digital storage media.

For instance, as illustrated in FIG. 5, environment 500 includes a depiction of an ablation device 501 ablating ablatable data layer 520. As ablatable media 505 spins in spinning direction 530, laser diode 502 ablates ablatable data layer 520 in a pattern corresponding to digital data 130. Once a portion of ablatable data layer 520 has been ablated, resulting ablated data points 515 remain in the data layer. FIG. 5 depicts one method of ablation where laser diode 502 shines a pulse of light or laser beam 510 onto ablatable data layer 520. The portion of ablatable data layer 520 directly below laser diode 502 is shown to be ablated, as if laser diode 502 had just finished ablating that data point.

It should be noted that the portion of ablatable media 505 shown in FIG. 5 is merely a cross section and only shows one sequence of ablated data. In some embodiments, digital data may be stored in ablatable data layer 520 as a series of tracks, similar to tracks in a CD or DVD. These tracks may begin from the center of the media and continuously work outwardly in a spiral fashion. Or, alternatively, the tracks may begin on the outside and work inwardly. Other embodiments may include ablating the media in alternative, non-spiral patterns in random or pseudo-random locations on the ablatable media item. Furthermore, ablatable media 105 may be stationary in some embodiments, while ablation device 501 with energy source 502 moves to various portions of the media item to ablate the item at those portions. In any of these embodiments, media item 105 may be in the shape of a disc, a square, a cube or any other shape compatible with the ablation device.

Figure 6:
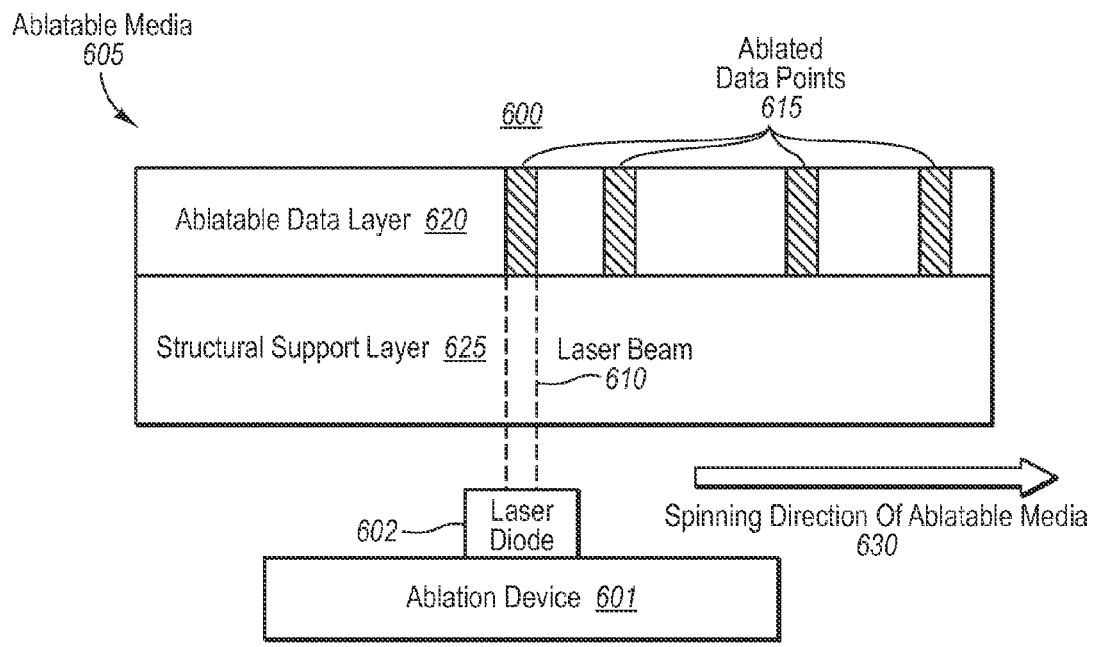
FIG. 6 illustrates an alternative component environment in which digital data may be recorded on an optically ablatable digital storage media.

Although environment 500 depicts ablation device 501 and laser diode 502 positioned above ablatable media 505, it is also possible, as shown in environment 600 of FIG. 6, for ablation device 601 and laser diode 602 to be positioned below ablatable media 605. Similar to FIG. 5, FIG. 6 shows ablatable data layer 620 of ablatable media 605 being ablated by ablation device 601 using laser diode 602. Ablatable media 605 is spun in the direction indicated by arrow 630 and ablatable data points 615 are similarly created corresponding to a pattern indicated by digital data 130.

In some embodiments, ablation devices 501 and 601 correspond to ablation device 101 of FIG. 1. It should also be noted that any type of ablatable media 105 may be ablated in the manners shown in FIGS. 5 and 6, respectively. For example, laser beam 510/610 may be modified to shine through one or more layers before ablating ablatable material in data layer 520/620. For example, as shown in FIG. 6, laser beam 610 may be shone through structural support layer 625 before ablating material on data layer 620. Furthermore, it should be noted that environments 500 and 600 may function in any type of geometric variation, other than as shown in FIGS. 5 and 6, such as sideways, upside down or any other position.

Again referring to FIG. 1, ablation device 101 and/or energy source 115 may be moveable in relation to the ablatable media. In some embodiments, ablation device 101 and/or energy source 115 may be attached to a servo motor (not shown) or other means of moving the device 101 and/or energy source 115 in relation to the media 105.

Ablatable media availability determination module 125 ("module 125") may be configured to determine the availability of ablatable media 105 in a variety of manners. For example, module 125 may be configured to communicate with energy source 115 which is capable of reading from or writing to ablatable media 105 via read/write channel 110. In some embodiments, module 125 may be configured to perform automatic checks to determine whether an ablatable media item is available for reading or writing. In other embodiments, module 125 may refrain from determining availability of any ablatable media until receiving an indication from a computer user or software module that one or more ablatable media items are ready to be accessed. Additionally or alternatively, ablatable media availability determination module 125 may be configured to communicate with ablation module 120. In such embodiments, module 125 may indicate to ablation module 120 that one or more ablatable media items 105 is available for reading from and/or writing to.

In some embodiments, at least one of the zero of more intervening layers includes one or more intervening layers and at least one of the one or more intervening layers is a reflective layer. For example, FIG. 3C depicts reflective layer 340C as an intervening layer between ablatable protective-absorptive layer 330C and structural support layer 320C. Reflective layer 340C may comprise a single material or a combination of materials. For example, reflective layer 340C may comprise titanium or chromium. In some embodiments, the titanium or chromium would be vapor deposited or sputtered onto the polycarbonate substrate. It may be advantageous, in some cases, to perform a plasma cleaning of the polycarbonate substrate to oxidize the structural support layer surface to which the reflective layer will be bonded. Titanium and chromium traditionally stick well to such oxidized surfaces.

Figure 3B:
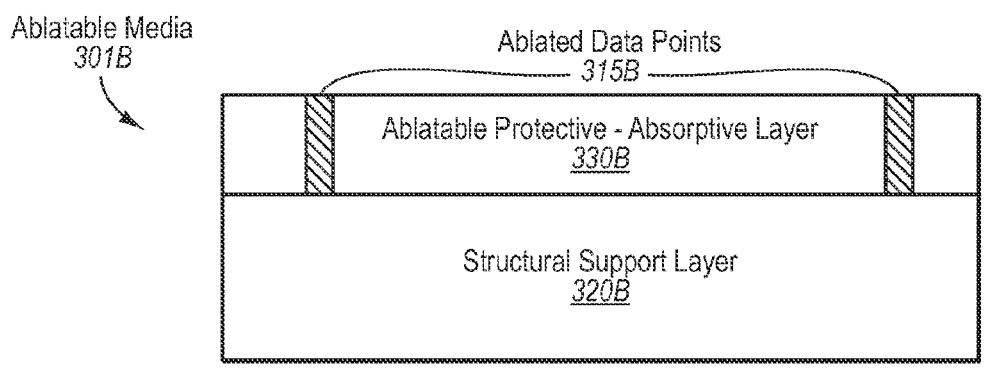
Figure 3C:
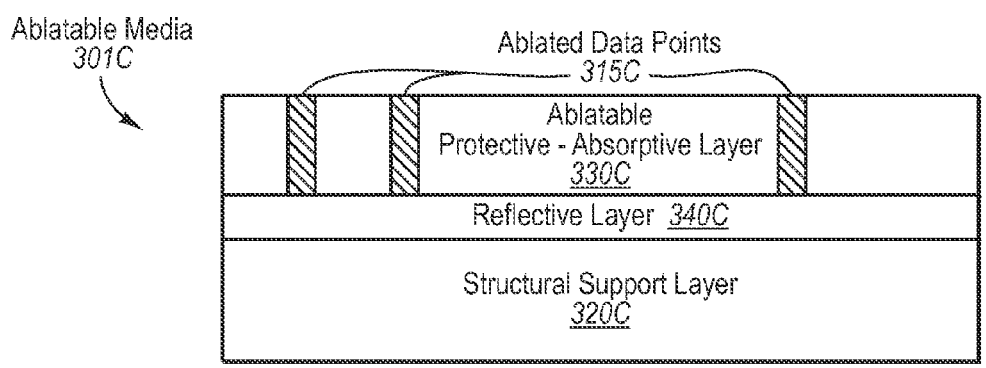
Figure 3D:
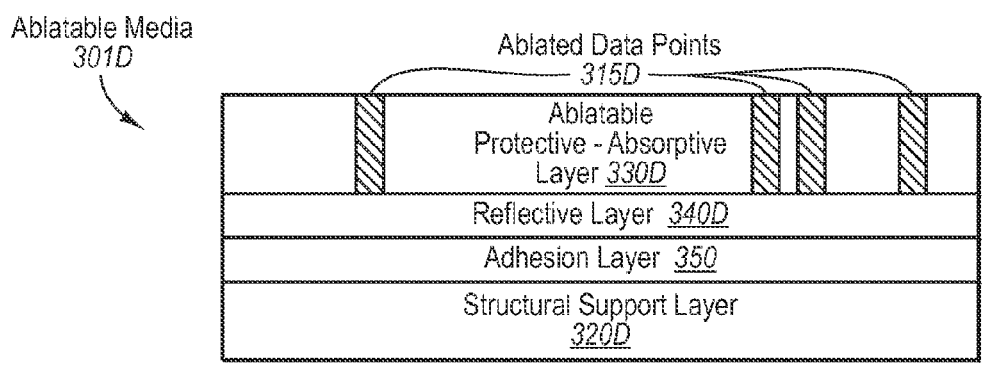

A reflective layer may be applied to any of ablatable media 301A-D, but is only shown in FIGS. 3C and 3D. Not only the reflective layer, but also any layer used in ablatable media 301 may be applied or "bonded" using some type of thin film deposition. Thin film deposition encompasses multiple methods of applying material to an object including sputtering, electron beam evaporation, plasma polymerization, chemical vapor deposition, spin-coating, dip-coating, evaporative deposition, electron beam physical vapor deposition, sputter deposition, pulsed laser deposition, ion beam assisted deposition, electroplating, molecular beam epitaxy or any other thin-film or thick-film deposition technique. In some cases, each layer may be applied subsequently, or in other cases, previously bonded layers may be applied to other (previously-bonded) layers.

For example, in FIG. 3D, ablatable protective-absorptive layer 330D and reflective layer 340D may be bonded while adhesion layer 350 and structural support layer are bonded. Each combination of layers, 330D/340D and 350/320D, respectively, may then be bonded to each other. An adhesion layer (e.g. adhesion layer 350) may be used to adhere any one layer to any other layer. Adhesive materials used in adhesion layer 350 may include any type of natural or synthetic materials, including metals, alloys, polymers, copolymers, ceramics, or organic small-molecules, or adhesives including any type of drying, contact, hot melt, light curing, reactive, pressure sensitive or other adhesives. Other layer combinations, layer orderings and/or layer bonding types are also possible. In some cases, it may be possible to use existing CD or DVD manufacturing techniques and/or manufacturing machines.

Figure 7:
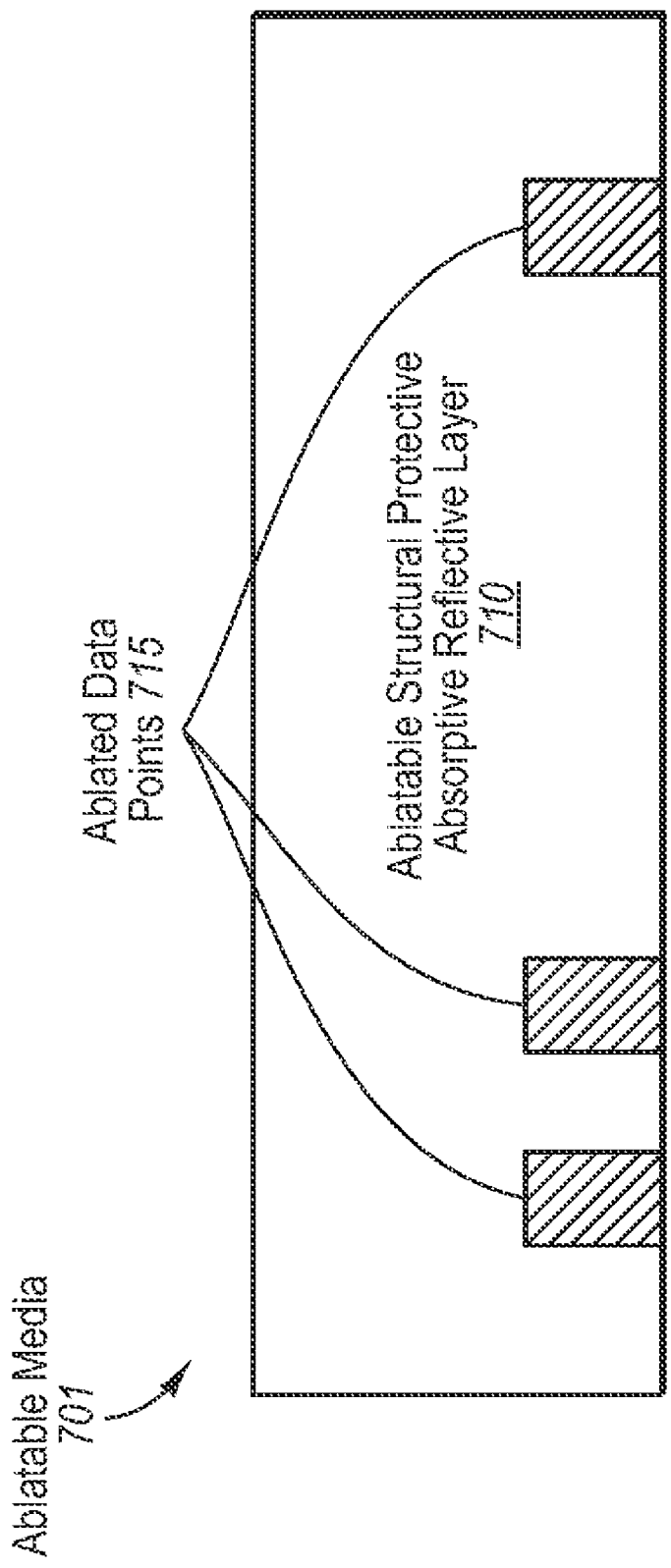
FIG. 7 illustrates an example cross-section of an alternative embodiment of an ablatable media item.

It should be noted in FIGS. 3, 4 and 7 that the layers depicted in ablatable media 301/401/701 are not drawn to scale and each layer may be much larger or smaller in size in relation to the other layers. For example, structural support layer 320A may be much thicker than other layers in order to provide structural rigidity and robustness. In some cases, it may be advantageous for structural support layer 320A to have high surface uniformity. That is, it may be optimal for structural support layer's surfaces to be as smooth and flat as possible. Structural support layer 320A may be formed using polycarbonate, silica, aluminum, silicon wafers, glass or glass-type material, or any other material that has high surface uniformity. Ablatable data layer 310A may also have an optimal thickness between 1-500 nanometers thick. Thickness of other layers such as reflective layer 340C, adhesion layer 350, protective layer 425A, absorptive layer 470 and ablatable protective-absorptive layer 330D may similarly be between 1-500 nanometers. In alternative embodiments, thicknesses of the various layers could be more or less than the 1-300 nm range mentioned above. Furthermore, although the surfaces of the various layers shown in FIGS. 3, 4 and 7 are depicted as being flat, the surfaces may be curved, beveled, tapered or indented. Additionally or alternatively, the surfaces may have pits, dips or other markings. For example, one or more of the surfaces may have tracking information embedded in the surface.

As mentioned above, layers may be formed and/or applied in a variety of ways. Examples other than those mentioned above include the following: a layer may be spin-coated onto a substrate and then caused to polymerize (cure) using UV light, a layer may be organically grown using various biological agents, characteristics of a layer may be altered at a certain depth, thereby effectively forming a layer, or magnetic nanoparticles may be applied to one or more of the layers such that a magnetic field could draw them to one side, thereby generating a sufficient gradient that, in effect, forms a layer. Other methods for creating and/or applying layers to an ablatable media may also be used.

In some cases, when sufficient optical contrast exists between the data layer and any subsequent layer, a reflective layer may or may not be included as a part of ablatable media 301 (as shown in FIGS. 3A and 3C). For example, if sufficient optical contrast exists between ablatable data layer 310A and structural support layer 320, a reflective layer may not be necessary for data to be read from and written to the media item. In some cases, a reflective layer provides proper optical contrast between layers such that data can be read from the media. For example, when a laser used to read digital data hits the data portion of the media item, the energy will be absorbed and little to no energy will be reflected. However, when the laser hits the reflective layer, the energy will be reflected and read as a reflection (corresponding to a digital 1 or 0). In other cases, an appropriate optical contrast may be provided without a reflective layer using various types of chemicals or other materials to generate a gradient effect that enhances the optical contrast.

In some embodiments, a reflective layer may be used to ensure that the ablation energy does not get transferred to any layers beyond the reflective layer. In such cases, the energy beam would ablate the material in the ablatable data layer and, once the beam reached the reflective layer, the beam would be reflected and thus not travel beyond the reflective layer. Detecting that an energy beam has reached a reflective layer and reflected off of it may be accomplished using a photodiode or other energy detecting mechanism.

Reflective layer 340C and adhesion layer 350 may be combined in some embodiments. For example, in FIG. 3C, reflective layer 340C is positioned between structural support layer 320C and ablatable protective-absorptive layer and may act as both a reflective layer that reflects energy from energy source 115 and as an adhesion layer that adheres the two adjacent layers. Thus, in some embodiments, the use of an adhesion layer is dependant on the type of reflective layer used or whether a reflective layer has been used.

Ablatable media 105 may also include protective layer 425A. In some embodiments, a protective layer is added to provide protection for ablatable data layer 410A. The protective layer may be optically opaque and is used at least partially for structural support and partially as a protective coating to prevent the data layer from being scratched or otherwise damaged. This protective layer may be added either before or after the recording process.

Ablatable media 105 may also include an absorptive layer 470. Absorptive layer 470 may be added to ablatable media 105 to absorb ablatable material that is not entirely ablated during the ablation process. For example, when an energy source such as laser diode 502 is focused on one portion of ablatable data layer 310A, all or a part of the ablatable material will be ablated at that point. Any material not entirely ablated may then be absorbed by absorptive layer 470. In some embodiments, it may be advantageous to use a low density material with a stiff, foamed structure that allows remaining ablatable material to be absorbed. Examples of such materials include foamed nickel or Aspen Aerogel™. In some embodiments, protective layer 425A and absorptive layer 470 may be combined into a single layer. These layers may be further combined with an ablatable data layer into ablatable protective-absorptive layer 330C.

Although previously mentioned in part or in whole, each embodiment depicted in FIGS. 3A-3D, 4A-4C and 7 will now be described. In some embodiments, ablatable media 301A-D are used in combination with environment 500 in which ablation device 501 and laser diode 502 are positioned above structural support layer 525. In alternative embodiments, ablatable media 401A-C are used in combination with environment 600 in which ablation device 601 and laser diode 602 are positioned below structural support layer 625. As mentioned above, the components of each of environments 500 and 600 may be placed horizontally, vertically, upside down or in any other geometric position with respect to the depictions in FIGS. 5 and 6.

Optimal orientation of the components may be determined by any one of a variety of factors. For example, the orientation of ablation device 501 to ablatable media 505 may depend on the intensity of laser beam 510, the wavelength of laser beam 510, the thickness of ablatable data layer 520, the thickness of structural support layer 525 or the materials used to form any of the possible layers used in forming ablatable media 505. The same is true for the orientation of ablation device 601 to ablatable media 605. It should also be noted that the layers depicted in FIGS. 3, 4 and 7 are not drawn to scale. Layer thicknesses and proportions in relation to other layers may be greater or smaller than those shown. Furthermore, FIGS. 3, 4 and 7 do not depict all envisioned embodiments for ablatable media 301/401/701. Other embodiments with different combinations of layers, using different materials for the various layers, and positioned in a variety of different positions are also possible. For example, any of ablatable media 301/401/701 may be used in combination with either or both of ablation devices 501 and 601.

FIG. 3A depicts ablatable media 301A that includes ablatable data layer 310A positioned on top of structural support layer 320A. Ablated data points 315A are shown in ablatable data layer 310A as portions of ablatable material that have been removed by ablation. In discussing FIGS. 3, 4 and 7, it should be noted that the terms "top" and "bottom" as used herein refer only to the way in which the various embodiments are illustrated. Neither the terms "top" or "bottom," nor the drawings necessarily imply that the media items will be used or fabricated in the manner shown.

FIG. 3B depicts ablatable media 301B that includes ablatable protective-absorptive layer 330B positioned on top of structural support layer 320B. Ablated data points 315B are shown in ablatable protective-absorptive layer 330B as portions of ablatable material that have been removed by ablation.

FIG. 3C depicts ablatable media 301C that includes ablatable protective-absorptive layer 330C positioned on top of reflective layer 340C, which is positioned on top of structural support layer 320C. Similar to FIG. 3B, ablated data points 315C are shown in ablatable protective-absorptive layer 330C as portions of ablatable material that have been removed by ablation.

FIG. 3D depicts ablatable media 301D that includes ablatable protective-absorptive layer 330D positioned on top of reflective layer 340D, which is positioned on top of adhesion layer 350, which is positioned on top of structural support layer 320D. Similar to FIGS. 3B & 3C, ablated data points 315D are shown in ablatable protective-absorptive layer 330D as portions of ablatable material that have been removed by ablation.

Figure 4A:
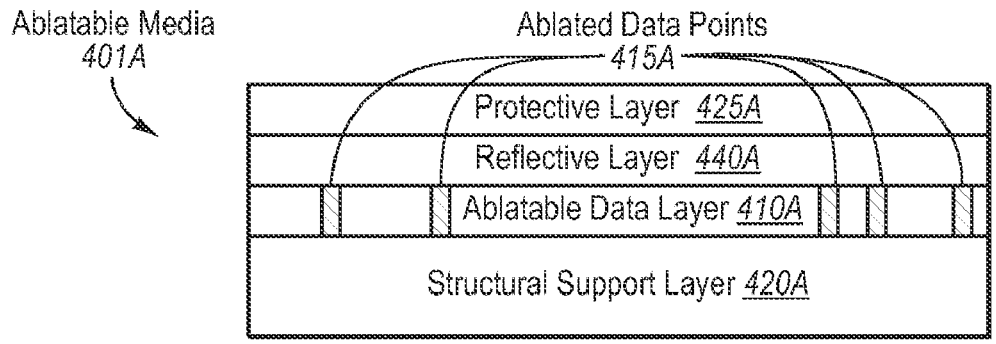
FIG. 4A through 4C each illustrate an example cross-section of various alternative embodiments of ablatable media items.

FIG. 4A depicts ablatable media 401A that includes protective layer 425A positioned on top of reflective layer 440A, which is positioned on top of ablatable data layer 410A, which is positioned on top of structural support layer 420A. Ablated data points 415A are shown in ablatable data layer 410A as positions of ablatable material that have been removed by ablation.

Figure 4B:
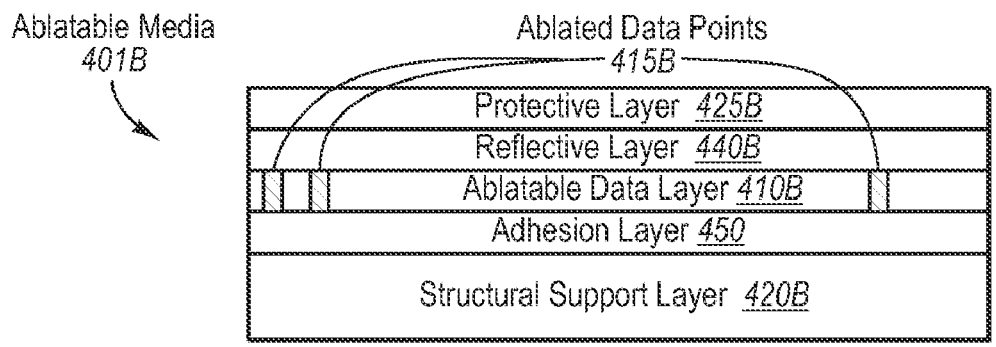

FIG. 4B depicts ablatable media 401B that includes protective layer 425B positioned on top of reflective layer 440B, which is positioned on top of ablatable data layer 410B, which is positioned on top of adhesion layer 450, which is positioned on top of structural support layer 420B. Similar to FIG. 4A, ablated data points 415B are shown in ablatable data layer 410B as positions of ablatable material that have been removed by ablation.

Figure 4C:
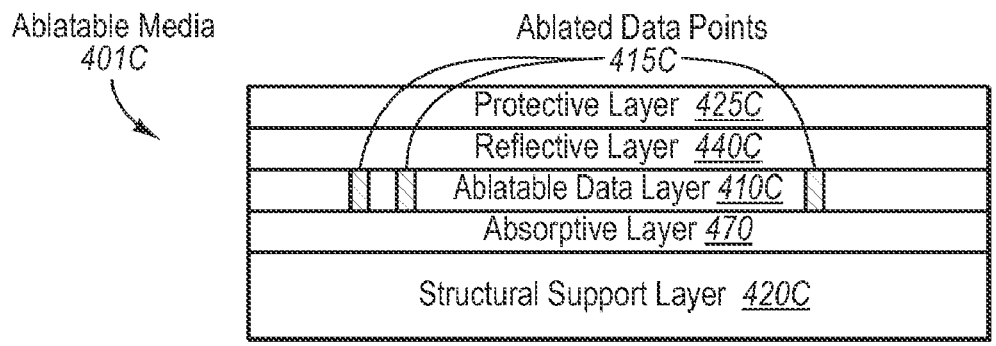

FIG. 4C depicts ablatable media 401C that includes protective layer 425C positioned on top of reflective layer 440C, which is positioned on top of ablatable data layer 410C, which is positioned on top of absorptive layer 470, which is positioned on top of structural support layer 420C. Similar to FIGS. 4A & 4B, ablated data points 415C are shown in ablatable data layer 410C as positions of ablatable material that have been removed by ablation. Each layer has been assigned a unique identifier in order to further distinguish that each layer may be separately formed, may be formed of different materials, may be ablated in a different fashion, may be bonded differently, may be positioned differently, may have varying thicknesses or any other characteristic that may be modified.

FIG. 7 depicts ablatable media 701 that includes ablatable structural protective absorptive reflective layer 710 and ablated data points 715. In some embodiments, layer 710 may be a single layer with one or more materials configured to provide an appropriate rigidity for ablatable media 701 and to provide ablatability such that one or more portions of layer 710 correspond to data points 715 that have been subject to ablation. It should be noted that, in some embodiments, ablation data points 715 do not proceed through the entire ablatable layer 710. Instead the data points 715 occupy only a small portion of the total thickness of the layer 710. For instance, when ablating a silicon wafer, in some cases the ablations are only a few dozen microns deep, whereas the remainder of the layer 710 is about 1200 microns (1.2 mm) thick. Other thicknesses and ablation depths may be used. Furthermore, the ablation depth of ablated data points 715 in FIG. 7 is relative and can be changed to be deeper or shallower, depending on the material used and/or the energy used for ablation.

Ablated data points 715 correspond to digital data that is recordable on layer 710. Ablatable media 701 may also include materials that are configured to provide protection for ablatable media 701, reflection for reflecting ablation energy, and/or absorption for absorbing ablated material. In some cases, layer 710 may comprise a plurality of materials where each material is designed to perform one of the above-listed functions. In other cases, a single material may provide all, or at least a portion of, the above-listed functionality.

In one embodiment, a silicon wafer may be used as layer 710. In this case, ablation would cause pits to form (ablated data points 715), as well as provide a sufficient optical contrast that data could be read from the media. The silicon wafer would provide structural rigidity, as well as protective, absorptive and reflective properties. In another embodiment, aluminum may be used in layer 710. In such a case, ablation would cause pits to form (ablated data points 715), but may not provide a sufficient optical contrast. To provide additional contrast, the aluminum may be anodized and/or acid etched to darken the pits, thus providing increased optical contrast. Furthermore, similar to the silicon wafer, aluminum may provide structural rigidity as well as protective, absorptive and reflective properties for layer 710. Although only aluminum and silicon were mentioned here, other single materials, such as glass, as well as other combinations of materials may be used to form layer 710.

Returning now to FIG. 2, method 200 also includes an act of receiving digital data that is to be recorded on a recording layer of an optically ablatable digital storage media where the recording layer is formed on a substrate with zero or more intervening layers between the recording layer and the substrate, and where the recording layer includes ablatable material configured to store digital data (act 220). For example, digital data receiving module 135 may receive digital data 130 that is to be recorded on ablatable data layer 310A of ablatable media 301A. As explained above, the digital data can be in any data format or file type, can be compressed or uncompressed, encrypted or unencrypted and can comprise any number of bits.

Method 200 also includes an act of ablating the ablatable material in the recording layer according to a sequence defined by the received digital data such that the ablated portions correspond to data points of the received digital data (act 230). For example, ablation module 120 may communicate digital data 130 to energy source 115 such that energy source 115 can be used to ablate ablatable media 105 according to a sequence defined by digital data 130. In some embodiments, energy source 115 is a laser diode. In such embodiments, optical energy may be used to ablate ablatable media 105 according to a sequence defined by digital data 130 such that the ablated portions correspond to data points of the digital data.

Thus, using the components and methods outlined in FIGS. 1-7, digital data may be permanently stored in ablated media 105. The process of ablation is designed to leave indelible marks in the ablatable media that will be readable for hundreds of years, or more.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a device configured to ablate one or more portions of ablatable material on an optically ablatable digital storage media, a method for recording digital data on an optically ablatable digital storage media, the method comprising:

receiving digital data to be recorded on a recording layer of an optically ablatable digital storage media, the recording layer being formed on a substrate with one or more intervening layers between the recording layer and the substrate, the recording layer comprising ablatable material configured to store digital data and the one or more intervening layers including at least an absorptive layer, wherein the ablatable material comprises glassy carbon; and ablating the ablatable material in the recording layer according to a sequence defined by the received digital data such that the ablated portions correspond to data points of the received digital data.

2. The method of claim 1, wherein the one or more intervening layers comprises a reflective layer.

3. The method of claim 1, further comprising determining that the optically ablatable storage media is available for recording.

4. The method of claim 1, wherein the recording layer has a thickness of between 1 and 500 nanometers.

5. An optically recordable media comprising:

a structural support layer sufficient to provide an appropriate rigidity for the optically recordable media;

an ablatable data layer including one or more portions corresponding to data points that have been subject to ablation, the data points corresponding to digital data that is recordable on the ablatable layer, wherein the ablatable data layer comprises glassy carbon; and an absorptive layer positioned adjacent the ablatable data layer to absorb ablatable material not entirely ablated during the ablation.

6. The optically recordable media of claim 5, wherein the ablatable data layer comprises a protective-absorptive layer.

7. The optically recordable media of claim 6, further comprising a reflective layer.

8. The optically recordable media of claim 7, wherein the protective-absorptive ablatable data layer is positioned above the reflective layer, the reflective layer being positioned above the structural support layer.

9. The optically recordable media of claim 8, further comprising an adhesion layer between the reflective layer and the structural support layer.

10. The optically recordable media of claim 7, wherein digital data is read and recorded from a side proximal to the ablatable data layer.

11. The optically recordable media of claim 5, further comprising a protective layer and a reflective layer.

12. The optically recordable media of claim 11, wherein the protective layer is positioned above the reflective layer, the reflective layer is positioned above the ablatable data layer, the ablatable data layer is positioned above the absorptive layer, and the absorptive layer is positioned above the structural support layer.

13. The optically recordable media of claim 12, wherein digital data is read and recorded from a side proximal to the structural support layer.

14. The optically recordable media of claim 5, wherein the ablatable data layer is deposited on the structural support layer with zero or more intervening layers between the ablatable data layer and the structural support layer.

15. An optically recordable media comprising:

a first layer configured to provide an appropriate rigidity for the optically recordable media;

a second layer configured to provide ablatability such that one or more portions of the second layer correspond to data points that have been subject to ablation, the data points corresponding to digital data that is recordable on the second layer; and a third layer configured to absorb ablatable material not entirely ablated during the ablation.

16. The optically recordable media of claim 15, further comprising a protective layer provided over the second layer.

17. The optically recordable media of claim 15, further comprising a reflective layer provided over the second layer configured to provide reflection for reflecting ablation energy.

18. The optically recordable media of claim 15, wherein the third layer includes a foamed structure.

19. The optically recordable media of claim 18, wherein the foamed structure is foamed nickel.

* * * * *